United States Patent [19]

Egashira et al.

[11] Patent Number: 5,559,188

[45] Date of Patent: Sep. 24, 1996

[54] GOLF BALL

[75] Inventors: Yoshinori Egashira; Yasushi Ichikawa; Hideo Watanabe, all of Chichibu, Japan

[73] Assignee: Bridgestone Sports Co., Ltd., Tokyo, Japan

[21] Appl. No.: 424,196

[22] Filed: Apr. 19, 1995

[30] Foreign Application Priority Data

Apr. 22, 1994 [JP] Japan .................................. 6-107711

[51] Int. Cl.$^6$ ............................ A63B 37/12; C08L 33/02; C08L 9/00
[52] U.S. Cl. ............................ 525/74; 525/196; 525/195; 525/192; 525/221; 525/208; 525/78; 473/385
[58] Field of Search ............................ 525/93, 192, 196, 525/221, 74; 273/235 R

[56] References Cited

U.S. PATENT DOCUMENTS

| | | | |
|---|---|---|---|
| 3,384,612 | 5/1968 | Brandt et al. | 260/41 |
| 3,454,676 | 7/1969 | Busse | 260/897 |
| 4,986,545 | 1/1991 | Sullivan | 273/235 R |
| 5,098,105 | 3/1992 | Sullivan . | |
| 5,187,013 | 2/1993 | Sullivan | 525/196 |

FOREIGN PATENT DOCUMENTS

| | | |
|---|---|---|
| 1177224 | 1/1970 | United Kingdom . |
| 2239458 | 7/1991 | United Kingdom . |

*Primary Examiner*—Carman J. Seccuro, Jr.
*Attorney, Agent, or Firm*—Sughrue, Mion, Zinn, Macpeak & Seas

[57] ABSTRACT

In a golf ball comprising a cover around a core, the cover is formed of a resin blend of 10–60 parts by weight of a thermoplastic elastomer having a crystalline polyethylene block and 90–40 parts by weight of an ionomer resin. The ball is well controllable, highly repulsive, and resistant to scuffing upon iron shots and offers pleasant hitting feel.

9 Claims, No Drawings

GOLF BALL

TECHNICAL FIELD

This invention relates to golf balls including solid golf balls and thread wound golf balls.

BACKGROUND

As the cover material of two-piece golf balls and some wound golf balls, ionomer resins in the form of ethylene-(meth)acrylic acid copolymers have been widely used and accepted because of their long-lasting impact resistance and cut resistance. Since the ionomer resins provide hard hitting feel and high hardness as compared with the balata rubber conventionally used as the cover material, golf balls with an ionomer resin cover are said difficult to impart a desired quantity of spin and inferior to control on iron shots.

For improvements in these respects, Sullivan, U.S. Pat. No. 4,884,814 or JP-A 308577/1989 proposes to blend a hard ionomer resin in the form of an ethylene-(meth)acrylic acid copolymer having a certain spectrum of physical properties with a specific amount of a soft ionomer resin in the form of an ethylene-(meth)acrylic acid-(meth)acrylate terpolymer. The soft/hard ionomer blend is used as a golf ball cover. This is a quite effective technique for improving the hitting feel and control of golf balls using a conventional ionomer resin in the form of an ethylene-(meth)acrylic acid copolymer as the cover.

Nevertheless, the golf ball cover of the above-mentioned soft/hard ionomer blend has several problems. The cover is softer and allows the ball to receive more spin on iron shots, which means the increased frictional force between the club face and the cover. Then balls using a hard core such as two-piece solid golf balls have the likelihood that the ball surface be scraped as a consequence of iron shots because the cover surface can be peeled by grooves across the iron club face.

Due to the reduced hardness, the ionomer cover itself is less repulsive so that the ball is also substantially reduced in repulsion.

An improvement in this regard is proposed in JP-A 277208/1993. A mixture of two or more metal salts of an ethylene-unsaturated carboxylic acid-unsaturated carboxylate terpolymer having a low flexural modulus is used as the cover for the purpose of protecting the ionomer cover against scuffing by iron club shots. This technique, however, is not practical because scuffing resistance upon iron club shots is still insufficient and because of reduced repulsion.

Therefore, there is a need for a golf ball having a good feel, good repulsion, a high spin rate, easy control, and resistance to scraping or burring.

An object of the invention is to provide a golf ball meeting such requirements.

SUMMARY OF THE INVENTION

We have found that by forming a golf ball cover from a blend of an ionomer resin with an appropriate amount of a thermoplastic elastomer having a crystalline polyethylene block as a resin component, partially because of good compatibility between them, there is obtained a solid or wound golf ball which presents a soft and pleasant feel on hitting, maintains repulsion, and has improved spin receptivity and controllability, and resistance to scuffing and scraping by iron shots.

Therefore, the present invention provides a golf ball comprising a core and a cover wherein the cover is formed of a resin composition containing 10 to 60 parts by weight of a thermoplastic elastomer having a crystalline polyethylene block and 90 to 40 parts by weight of an ionomer resin as a main resin component.

BEST MODE FOR CARRYING OUT THE INVENTION

Briefly stated, in the golf ball of the present invention, a blend of an ionomer resin with a thermoplastic elastomer having a crystalline polyethylene block is used as the resin component of which the cover is made. Ionomer resin is softened by blending a thermoplastic elastomer having a crystalline polyethylene block therein. Then there is obtained a cover which is improved in playing feel and controllability while restraining a substantial loss of repulsion ability. The cover is less susceptible to scuffing flaws by iron club shots as compared with covers of ionomer resins having the same hardness.

Preferably, the thermoplastic elastomer having a crystalline polyethylene block used herein is a thermoplastic elastomer having a hard segment in the form of a crystalline polyethylene block (E) or a crystalline polyethylene block (E) and a crystalline polystyrene block (S) and a soft segment in the form of a relatively random copolymer structure consisting of ethylene and butylene (EB). The preferred thermoplastic elastomers are block copolymers of a molecular structure having the hard segment at one end or both ends thereof, typically E-EB, E-EB-E, and E-EB-S structures.

These thermoplastic elastomers are obtained by hydrogenating polybutadiene and styrene-butadiene copolymers. The polybutadiene and styrene-butadiene copolymers to be hydrogenated are preferably butadiene polymers having 1,4-polymerized blocks with a 1,4-bond content of at least 95% by weight and containing at least 50% by weight, especially at least 80% by weight of 1,4-bond based on the entire weight of butadiene structure. In particular, thermoplastic elastomers of the E-EB-E type are obtained by hydrogenating polybutadiene wherein both ends of its molecular chain are 1,4-polymers rich in 1,4-bond and an intermediate portion is a mixture of 1,4-bond and 1,2-bond. The percent hydrogenation of hydrogenated products of polybutadiene and styrene-butadiene copolymers (that is, percent conversion of double bonds in polybutadiene and styrene-butadiene copolymers into saturated bonds) is preferably 60 to 100%, more preferably 90 to 100%. With a percent hydrogenation of less than 60%, gelation and deterioration would occur in blending a hydrogenated polybutadiene with an ionomer resin and problems would arise with respect to the weatherability and hitting durability of the resulting cover.

Preferably the thermoplastic elastomers contain about 10 to 50% by weight of the hard segment. Elastomers containing more than 50% by weight of the hard segment would be less flexible, failing to achieve the objects of the invention. With less than 10% by weight of the hard segment, the resulting blend would be less moldable. The thermoplastic elastomers preferably have a number average molecular weight of about 30,000 to 800,000.

The thermoplastic elastomers having a crystalline polyethylene block are commercially available, for example, under the trade name of Dynaron E6100P, HSB604, and E4600P from Japan Synthetic Rubber Co. Ltd. Especially Dynaron E6100P which is a block polymer having a crystalline olefin block at each end is useful in the practice of the invention.

The ionomer resin to be blended with the thermoplastic elastomer may be any of conventional ionomer resins which have been commonly used as the golf ball cover material. Useful are copolymers of α-olefin and α,β-unsaturated carboxylic acid, and copolymers of α-olefin, α,β-unsaturated carboxylic acid and ester thereof wherein the carboxyl groups are neutralized with metal ions (e.g., Na, Li, Zn, Mg, and K ions). Examples of the α-olefin include those having a relatively small number of carbon atoms such as ethylene and propylene; examples of the α,β-unsaturated carboxylic acid include acrylic acid, methacrylic acid, maleic acid and fumaric acid, with the acrylic and methacrylic acid being preferred; and examples of the ester include those obtained by reacting the above-mentioned carboxylic acids with lower alcohols such as methanol, ethanol, propanol, n-butanol and isobutanol, with acrylates and methacrylates being preferred. The binary copolymers of α-olefin and α,β-unsaturated carboxylic acid desirably contain 5 to 20% by weight of the α,β-unsaturated carboxylic acid. The terpolymers of α-olefin, α,β-unsaturated carboxylic acid and ester thereof desirably contain 1 to 10% by weight of the α,β-unsaturated carboxylic acid and 12 to 45% by weight of the ester. Preferably the degree of neutralization with metal ions is about 10 to 90 mol % of the acid groups.

These ionomer resins are commercially available under the trade name of "Surlyn" from E. I. dupont and "Himilan" from Mitsui dupont Polychemical Co. Ltd.

From the standpoint of improving repulsion or restitution, it is preferred to use a mixture of an ionomer of a monovalent metal and an ionomer of a divalent metal, especially in a weight ratio of from 20/80 to 80/20.

In accordance with the present invention, the thermoplastic elastomer having a crystalline polyethylene block and the ionomer resin are blended such that the blend contains 10 to 60 parts by weight, preferably 20 to 45 parts by weight of the thermoplastic elastomer and 90 to 40 parts by weight, preferably 80 to 55 parts by weight of the ionomer resin provided that the total of the two components is 100 parts by weight. Blending less than 10 parts by weight of the thermoplastic elastomer is insufficient for softening purposes so that hitting feel and controllability are not improved. More than 60 parts by weight of the thermoplastic elastomer detracts from cut resistance.

Better results are obtained when an olefinic polymer modified with a carboxylic acid and/or an epoxy compound (for example, an olefinic polymer having a carboxylic acid and/or an epoxy compound block or graft copolymerized thereto or a polymer product obtained by further block or graft polymerizing another polymer to the olefinic polymer) is added to the mixture of thermoplastic elastomer and ionomer resin mentioned above. As a consequence of blending such an additional block or graft polymer, reaction or interaction takes place between the carboxyl group of the ionomer resin and the carboxylic acid or epoxy compound in the additional polymer to further improve the compatibility between the ionomer resin and the thermoplastic elastomer, which insures an improvement in scuffing resistance at low temperature.

Preferred carboxylic acids which can be used herein are carboxylic acids having an aliphatic unsaturated bond including acrylic acid, methacrylic acid, maleic acid, itaconic acid, maleic anhyride, and itaconic anhydride. Preferred epoxy compounds which can be used herein are epoxy compounds having an aliphatic unsaturated bond including glycidyl acrylate, glycidyl methacrylate, and allyl glycidyl ether. The olefinic polymers to be modified with the carboxylic acid or epoxy compound are preferably polymers composed mainly of α-monoolefin having 2 to 4 carbon atoms and copolymers obtained by hydrogenating polymers composed mainly of a conjugated diene, for example, such as polyethylene, polypropylene, propylene-ethylene copolymers, propylene-butene copolymers, hydrogenated polybutadiene, and hydrogenated butadiene-styrene copolymers. Examples of the olefinic polymer modified with carboxylic acid and/or epoxy compound include Tuftec M1943 (commercially available from Asahi Chemicals Co. Ltd.), T7711SP (modified EPR commercially available from Japan Synthetic Rubber Co. Ltd.), and Bondfast 2C (commercially available from Sumitomo Chemical Industry Co. Ltd.).

In the practice of the invention, the olefinic polymer modified with a carboxylic acid and/or an epoxy compound is preferably added in an amount of about 0.1 to 20% by weight, especially about 0.5 to 15% by weight based on the entire resin component of which the cover is formed. Addition of more than 20% by weight of the olefinic polymer would lead to a lower melt index and lower repulsion of the cover. Less than 0.1% by weight of the olefinic polymer would be ineffective for its purpose.

The resin composition of which the cover is formed contains as a major component a resin component consisting of the thermoplastic elastomer, the ionomer resin and optionally the olefinic polymer having a carboxylic acid and/or an epoxy compound copolymerized thereto. If desired, the composition further contains various additives, for example, pigments, dispersants, anti-oxidants, and UV absorbers in conventional amounts.

The cover which is formed from the resin composition should preferably have a hardness of 40 to 60, more preferably 45 to 55 on Shore D hardness scale. A cover with a Shore D hardness of less than 40 would be less repulsive. A Shore D hardness of more than 60 would adversely affect hitting feel and controllability.

The core to be enclosed in the cover may be for solid golf balls or wound golf balls. The cover according to the invention is especially effective when combined with solid golf ball cores. The cores for solid golf balls, that is, solid cores include cores for two-piece golf balls and cores for multiple solid golf balls (typically three-piece golf balls). Any of solid cores prepared from well-known compositions by well-known techniques may be used.

The cores for wound golf balls, that is, wound cores are comprised of a center having thread rubber wound thereon. The center may be either a liquid center or a solid center. Any of wound cores prepared from well-known compositions by well-known techniques may be used.

Any desired method may be used in forming the cover on the core. For example, the cover-forming resin composition is directly injection molded around the core. Alternatively, the cover-forming resin composition is molded to form a pair of semi-spherical shells or half-cups, the core is enclosed in the half-cups which are heat formed under pressure at 110° to 160° C. for 2 to 10 minutes.

The golf ball of the invention is prepared to the size and weight according to the golf ball rules. Preferably the cover has a (radial) thickness of 1 to 3 mm.

EXAMPLE

Examples of the present invention are given below by way of illustration and not by way of limitation.

Examples 1–13 and Comparative Examples 1–6

For the manufacture of two-piece golf balls, a solid core having a diameter of 38.5 mm was prepared by milling a rubber composition of the following formulation and effecting vulcanization at 155° C. for 20 minutes.

| Rubber composition (Core) | Parts by weight |
|---|---|
| Polybutadiene rubber (BR01 by Japan Synthetic Rubber Co. Ltd.) | 100 |
| Zinc diacrylate | 27 |
| Zinc oxide | 10 |
| Barium sulfate | 12.5 |
| Dicumyl peroxide | 0.9 |

Next, a cover composition was prepared by milling 100 parts by weight of a resin component blended as shown in Table 1 with 5 parts by weight of titanium oxide and 0.3 part by weight of magnesium stearate in a twin screw extruder. The cover composition was injection molded over the solid core to form a cover of 2.1 mm thick thereon.

The resulting golf balls were examined by the following tests.

(1) Hardness

Hardness is expressed by a distortion (mm) of a ball under a static load of 100 kg. Higher values indicate softer balls.

(2) Initial speed

An initial speed (m/s) was measured by an initial speed meter of the same type as prescribed by USGA.

(3) Hitting feel

With No. 1 wood (or driver), an actual hitting test was performed by a panel of five professional golfers and five skilled amateur golfers. The criterion for evaluation is given below.

⊚: very good
O: good
X: bad (4) Controllability

With an iron, an actual hitting test was performed by a panel of five professional golfers and five skilled amateur golfers. The criterion for evaluation is given below.

⊚: very good
O: good
X: bad (5) Scuffing resistance upon iron shots

A ball was kept at a temperature of 23° C. A pitching wedge was mounted on a swing robot machine. The ball was normally hit at three positions by the pitching wedge at a head speed of 37 m/s. The three hit areas were visually observed. Evaluation was made according to the following criterion.

| Point | Remarks |
|---|---|
| 5 | no change on the ball surface or very slight club face dent |
| 4 | substantial club face dent, but no scrapes from the cover surface |
| 3 | ragged surface with perceivable scrapes |
| 2 | ragged surface with some cracks |
| 1 | dimples scraped |

(6) Cut resistance

A ball was kept at a temperature of 23° C. A pitching wedge was mounted on a swing robot machine. The ball at the top was hit at a head speed of 32 m/s. Cut defects were visually observed. Ratings are "O" for no defects and "X" for defects.

The results are shown in Table 1.

TABLE 1

| Example | 1 | 2 | 3 | 4 | 5 | 6 | 7 | 8 | 9 | 10 |
|---|---|---|---|---|---|---|---|---|---|---|
| Cover resin composition (pbw) | | | | | | | | | | |
| H1706 (Zn) | 42 | 35 | 25 | — | — | 42 | 35 | 25 | — | — |
| H1605 (Na) | 42 | 35 | 25 | — | — | 42 | 35 | 25 | — | — |
| H1557 (Zn) | — | — | — | 35 | 25 | — | — | — | 35 | 25 |
| H1856 (Na) | — | — | — | 35 | 25 | — | — | — | 35 | 25 |
| S8120 (Na) | — | — | — | — | — | — | — | — | — | — |
| Dynaron E6100P | 16 | 30 | 50 | 30 | 50 | — | — | — | — | — |
| Dynaron E4600P | — | — | — | — | — | 16 | 30 | 50 | 30 | 50 |
| Bondfast 2C | — | — | — | — | — | — | — | — | — | — |
| Tuftec M1943 | — | — | — | — | — | — | — | — | — | — |
| T7711SP | — | — | — | — | — | — | — | — | — | — |
| Kraton G1652 (SEBS) | — | — | — | — | — | — | — | — | — | — |
| Septon 2002 (SEPS) | — | — | — | — | — | — | — | — | — | — |
| Cover resin hardness (Shore D) | 58 | 56 | 50 | 53 | 48 | 56 | 53 | 50 | 51 | 47 |
| Ball properties | | | | | | | | | | |
| Weight (g) | 45.3 | 45.2 | 45.2 | 45.0 | 44.8 | 45.3 | 45.3 | 45.2 | 45.2 | 45.0 |
| Hardness (mm) | 2.42 | 2.52 | 2.62 | 2.58 | 2.73 | 2.52 | 2.57 | 2.64 | 2.65 | 2.76 |
| Initial speed (m/s) | 77.5 | 77.4 | 77.2 | 77.2 | 77.1 | 77.6 | 77.4 | 77.1 | 77.2 | 77.1 |
| Hitting feel | O | O | ⊚ | ⊚ | ⊚ | O | ⊚ | ⊚ | ⊚ | ⊚ |
| Controllability | O | O | ⊚ | ⊚ | ⊚ | O | ⊚ | ⊚ | ⊚ | ⊚ |
| Scuffing resistance | 5 | 5 | 5 | 5 | 5 | 5 | 5 | 5 | 5 | 5 |
| Cut resistance | O | O | O | O | O | O | O | O | O | O |

| | Example | | | Comparative Example | | | | | |
|---|---|---|---|---|---|---|---|---|---|
| | 11 | 12 | 13 | 1 | 2 | 3 | 4 | 5 | 6 |
| Cover resin composition (pbw) | | | | | | | | | |
| H1706 (Zn) | 35 | 35 | 35 | 50 | 25 | — | 35 | 35 | 35 |
| H1605 (Na) | 35 | 35 | 35 | 50 | 25 | — | 35 | 35 | 35 |

TABLE 1-continued

|  | | | | | | | | | |
|---|---|---|---|---|---|---|---|---|---|
| H1557 (Zn) | — | — | — | — | — | 25 | — | — | — |
| H1856 (Na) | — | — | — | — | — | 25 | — | — | — |
| S8120 (Na) | — | — | — | — | 50 | 50 | — | — | — |
| Dynaron E6100P | 20 | 15 | 15 | — | — | — | — | — | — |
| Dynaron E4600P | — | — | — | — | — | — | — | — | — |
| Bondfast 2C | 10 | — | — | — | — | — | — | — | — |
| Tuftec M1943 | — | 15 | — | — | — | — | — | — | 30 |
| T7711SP | — | — | 15 | — | — | — | — | — | — |
| Kraton G1652 (SEBS) | — | — | — | — | — | — | 30 | — | — |
| Septon 2002 (SEPS) | — | — | — | — | — | — | — | 30 | — |
| Cover resin hardness (Shore D) | 56 | 54 | 54 | 64 | 54 | 51 | 53 | 54 | 53 |
| Ball properties | | | | | | | | | |
| Weight (g) | 45.2 | 45.2 | 45.1 | 45.4 | 45.2 | 45.2 | 45.2 | 45.2 | 45.2 |
| Hardness (mm) | 2.52 | 2.55 | 2.56 | 2.35 | 2.55 | 2.66 | 2.58 | 2.59 | 2.60 |
| Initial speed (m/s) | 77.3 | 77.4 | 77.3 | 77.7 | 76.7 | 76.5 | 77.1 | 77.0 | 77.1 |
| Hitting feel | O | ⊚ | ⊚ | X | ⊚ | ⊚ | ⊚ | ⊚ | ⊚ |
| Controllability | O | ⊚ | ⊚ | X | ⊚ | ⊚ | ⊚ | ⊚ | ⊚ |
| Scuffing resistance | 5 | 5 | 5 | 4 | 2 | 2 | 3 | 3 | 4 |
| Cut resistance | O | O | O | O | X | X | X | X | X |

Ionomer Resins

H1706: ethylene-methacrylic acid copolymer ionomer, acid content about 15 wt %, ion species Zn, degree of ionization about 60 mol %

H1605: ethylene-methacrylic acid copolymer ionomer, acid content about 15 wt %, ion species Na, degree of ionization about 30 mol %

H1557: ethylene-methacrylic acid copolymer ionomer, acid content about 12 wt %, ion species Zn, degree of ionization about 60 mol %

H1856: ethylene-methacrylic acid-methacrylate terpolymer ionomer, acid content about 10 wt %, ion species Na, ester content about 10 wt %

S8120: ethylene-methacrylic acid-methacrylate terpolymer ionomer, acid content about 10 wt %, ion species Na, ester content about 20 wt %

These are all available from Mitsui Dupont Polychemical Co. Ltd.

Thermoplastic Elastomers

Dynaron E6100P: block copolymer of the E-EB-E type, hydrogenated polybutadiene, styrene content 0 wt %, commercially available from Japan Synthetic Rubber Co. Ltd.

Dynaron E4600P: block copolymer of the E-EB-S type, hydrogenated butadiene-styrene copolymer, styrene content 20 wt %, commercially available from Japan Synthetic Rubber Co. Ltd.

Kraton G1652: styrenic thermoplastic elastomer (SEBS), styrene content 29 wt %, commercially available from Shell Chemical Septon 2002: styrenic thermoplastic elastomer (SEPS), styrene content 30 wt %, commercially available from Kuraray Co. Ltd.

Modified Olefinic Polymers

Tuftec M1943: maleic anhydride-modified styrenic thermoplastic elastomer (SEB system), acid value 10 mg $CH_3ONa/g$, styrene content 20 wt %, commercially available from Asahi Chemicals Industry Co. Ltd.

Bondfast 2C: ethylene-glycidyl methacrylate copolymer, GMA content 6 wt %, Shore D hardness 46, commercially available from Sumitomo Chemical Industry Co. Ltd.

T7711SP: maleic anhydride-modified EPR, acid addition 0.8 wt %, JIS A hardness 70, commercially available from Japan Synthetic Rubber Co. Ltd.

As seen from Table 1, the golf balls within the scope of the invention (Examples 1 to 13) have pleasant hitting feel, good controllability, a high initial velocity (indicating high repulsion), improved scuffing resistance upon iron shots, and improved cut resistance.

There has been described a golf ball having a cover formed from a blend of a thermoplastic elastomer having a crystalline polyethylene block and an ionomer resin whereby the ball is pleasant in hitting feel, well controllable, highly repulsive, and resistant to scuffing when struck by iron clubs.

Japanese Patent Application No. 107711/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A golf ball comprising a core and a cover around the core, said cover being formed of a resin composition comprising 10 to 60 parts by weight of a thermoplastic elastomer having a crystalline polyethylene block, wherein said thermoplastic elastomer is a hydrogenated product of a polybutadiene or a styrene-butadiene copolymer having a hard segment in the form of a polyethylene block or a polyethylene block and a polystyrene block and a soft segment in the form of an ethylene/butylene random copolymer and 90 to 40 parts by weight of an ionomer resin.

2. The golf ball of claim 1 wherein said composition further contains an olefinic polymer modified with a carboxylic acid or an epoxy compound or both.

3. The golf ball of claim 1 wherein said thermoplastic elastomer comprises a hard segment having a crystalline polyethylene block and a crystalline polystyrene block and a soft segment having a copolymer comprising ethylene and butylene.

4. The golf ball of claim 1 wherein said thermoplastic elastomer comprises a hydrogenated butadiene polymer having 1,4-polymerized blocks with a 1,4-bond content of at least 95% by weight.

5. The golf ball of claim 3 wherein said hard segment comprises from 10% to 50% by weight of the thermoplastic elastomer.

6. The golf ball of claim 1 wherein said thermoplastic elastomers have a number average molecular weight of from 30,000 to 800,000 a.m.u.

7. A golf ball comprising a core and a cover surrounding said core, said cover being formed of a resin composition comprising (a) 10 to 60 parts by weight of a hydrogenated product of a polybutadiene having a crystalline polyethylene block hard segment and a soft segment in the form of an ethylene/butylene random copolymer, (b) 90 to 40 parts by weight of an ionomer resin, and (c) an olefinic polymer modified with a carboxylic acid and/or an epoxy compound in an amount of about 0.1 to 20% by weight based on the entire resin components (a) and (b).

8. The golf ball of claim 7 wherein said olefinic polymer comprises modified copolymers of ethylene and propylene and styrenic block copolymers.

9. The golf ball of claim 7 wherein said olefinic polymer is maleic anhydride-functionalized hydrogenated butadiene-styrene copolymer.

* * * * *